(12) United States Patent
Joseph et al.

(10) Patent No.: US 11,662,196 B2
(45) Date of Patent: May 30, 2023

(54) TRAILER ANGLE DETECTION SYSTEM USING REAR CAMERA OF VEHICLE

(71) Applicant: Magna Electronics Inc., Auburn Hills, MI (US)

(72) Inventors: Harold E. Joseph, Brampton (CA); Joshua Teichroeb, Mississauga (CA); Alexander Velichko, Toronto (CA); Jyothi P. Gali, Rochester Hills, MI (US); Guruprasad Mani Iyer Shankaranarayanan, Mississauga (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 443 days.

(21) Appl. No.: 15/929,535

(22) Filed: May 8, 2020

(65) Prior Publication Data

US 2020/0356788 A1 Nov. 12, 2020

Related U.S. Application Data

(60) Provisional application No. 62/844,834, filed on May 8, 2019.

(51) Int. Cl.
| | |
|---|---|
| *G06V 20/56* | (2022.01) |
| *B60R 11/04* | (2006.01) |
| *B60R 1/00* | (2022.01) |
| *G01B 11/26* | (2006.01) |

(52) U.S. Cl.
CPC ............ *G06V 20/56* (2022.01); *B60R 1/003* (2013.01); *B60R 11/04* (2013.01); *G01B 11/26* (2013.01); *B60R 2300/10* (2013.01); *B60R 2300/20* (2013.01); *B60R 2300/607* (2013.01); *B60R 2300/806* (2013.01)

(58) Field of Classification Search
None
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,498,620 | B2 | 12/2002 | Schofield et al. |
| 6,690,268 | B2 | 2/2004 | Schofield et al. |
| 7,038,577 | B2 | 5/2006 | Pawlicki et al. |

(Continued)

*Primary Examiner* — Rebecca A Volentine
(74) *Attorney, Agent, or Firm* — Honigman LLP

(57) ABSTRACT

A vehicular trailer assist system includes a control that includes an image processor for processing image data captured by the camera representative of at least a portion of a trailer hitched to the vehicle. The control determines whether the trailer has been previously hitched to the vehicle. Responsive to the trailer not being previously hitched, the control operates in a trailer initial calibration mode. Responsive to the control recognizing the trailer, the control operates in a recognized trailer calibration mode. The control obtains calibration data unique to the hitched trailer. The control, responsive to obtaining the calibration data, processes image data captured by the camera using the calibration data to locate the current position of the trailer relative to the vehicle. The control, responsive to locating the current position of the trailer relative to the vehicle, determines a trailer angle based on the located current position.

17 Claims, 11 Drawing Sheets

(56) References Cited

U.S. PATENT DOCUMENTS

| | | |
|---|---|---|
| 7,720,580 B2 | 5/2010 | Higgins-Luthman |
| 7,855,755 B2 | 12/2010 | Weller et al. |
| 9,085,261 B2 | 7/2015 | Lu et al. |
| 9,264,672 B2 | 2/2016 | Lynam |
| 9,446,713 B2 | 9/2016 | Lu et al. |
| 9,558,409 B2 | 1/2017 | Pliefke et al. |
| 10,071,687 B2 | 9/2018 | Ihlenburg et al. |
| 10,086,870 B2 | 10/2018 | Gieseke et al. |
| 10,099,614 B2 | 10/2018 | Diessner |
| 10,160,382 B2 | 12/2018 | Pliefke et al. |
| 10,532,698 B2 | 1/2020 | Potnis et al. |
| 10,552,976 B2 | 2/2020 | Diessner et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 11,417,116 B2 | 8/2022 | Joseph et al. |
| 2014/0063197 A1 | 3/2014 | Yamamoto et al. |
| 2014/0085472 A1 | 3/2014 | Lu et al. |
| 2014/0160276 A1 | 6/2014 | Pliefke et al. |
| 2014/0267688 A1 | 9/2014 | Aich et al. |
| 2015/0002670 A1 | 1/2015 | Bajpai |
| 2015/0217693 A1 | 8/2015 | Pliefke et al. |
| 2016/0049020 A1 | 2/2016 | Kuehnle et al. |
| 2017/0050672 A1 | 2/2017 | Gieseke et al. |
| 2017/0174128 A1 | 6/2017 | Hu et al. |
| 2017/0217372 A1 | 8/2017 | Lu et al. |
| 2017/0254873 A1 | 9/2017 | Koravadi |
| 2017/0280091 A1 | 9/2017 | Greenwood et al. |
| 2017/0341583 A1* | 11/2017 | Zhang .................. H04N 7/181 |
| 2018/0056868 A1* | 3/2018 | Naserian ................ B60R 1/003 |
| 2018/0211528 A1 | 7/2018 | Seifert |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0061815 A1* | 2/2019 | Sanvicente Herrera ..................... B62D 15/025 |
| 2019/0064831 A1 | 2/2019 | Gali et al. |
| 2019/0118860 A1 | 4/2019 | Gali et al. |
| 2019/0143895 A1 | 5/2019 | Pliefke et al. |
| 2019/0241126 A1 | 8/2019 | Murad et al. |
| 2019/0297233 A1 | 9/2019 | Gali et al. |
| 2019/0329821 A1 | 10/2019 | Ziebart et al. |
| 2019/0347498 A1 | 11/2019 | Herman et al. |
| 2019/0347825 A1 | 11/2019 | Gupta et al. |
| 2020/0017143 A1 | 1/2020 | Gali |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2021/0078634 A1 | 3/2021 | Jalalmaab et al. |
| 2021/0094473 A1 | 4/2021 | Gali et al. |
| 2021/0170820 A1 | 6/2021 | Zhang |
| 2021/0170947 A1 | 6/2021 | Yunus et al. |

* cited by examiner

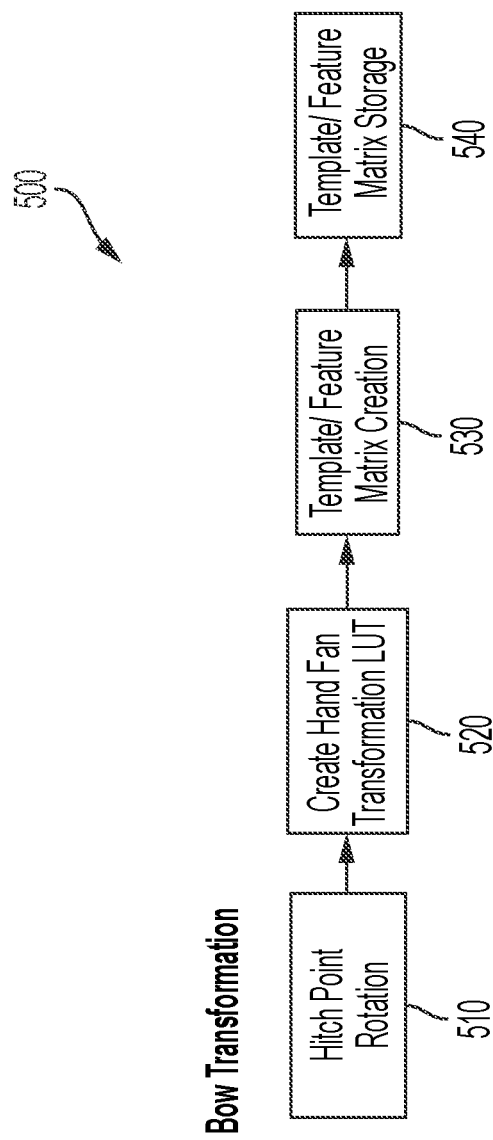

TRAILER ANGLE DETECTION SYSTEM USING REAR CAMERA OF VEHICLE

CROSS REFERENCE TO RELATED APPLICATION

The present application claims the filing benefits of U.S. provisional application Ser. No. 62/844,834, filed May 8, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Trailer assist systems are known that may determine an angle of a trailer hitched at a vehicle. Examples of such known systems are described in U.S. Pat. Nos. 9,085,261 and/or 6,690,268, which are hereby incorporated herein by reference in their entireties.

SUMMARY OF THE INVENTION

The present invention provides a driver assistance system or vision system or imaging system for a vehicle that utilizes a camera disposed at a rear portion of a vehicle and having a field of view exterior of the vehicle, the field of view encompassing at least a portion of a trailer hitched to the vehicle. The system also includes a control comprising an image processor operable to process image data captured by the camera, with the image data captured by the camera representative of the trailer hitched to the vehicle. The control is operable determine whether the trailer has been previously hitched to the vehicle. Responsive to the control determining that the trailer has not been previously hitched to the vehicle, the control operates in a trailer initial calibration mode comprising a bow transformation. Responsive to the control recognizing the trailer and determining that the trailer has been previously hitched to the vehicle, the control operates in a recognized trailer calibration mode. While operating in the trailer initial calibration mode or in the recognized trailer calibration mode, the control obtains calibration data unique to the hitched trailer. The control, responsive to obtaining the calibration data, scans for the trailer using the calibration data to locate a current position of the trailer and extracts the trailer angle based on the current position of the trailer.

These and other objects, advantages, purposes and features of the present invention will become apparent upon review of the following specification in conjunction with the drawings.

BRIEF DESCRIPTION OF THE DRAWINGS

FIG. 5 is a block diagram of a transformation module in accordance with the present invention;

DESCRIPTION OF THE PREFERRED EMBODIMENTS

A vehicle and trailer maneuvering system or maneuver assist system and/or driving assist system operates to capture images exterior of the vehicle and of a trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The vision system includes an image processor or image processing system that is operable to receive image data from one or more cameras and that may provide an output to a display device for displaying images representative of the captured image data. Optionally, the vision system may provide a display, such as a rearview display or a top down or bird's eye or surround view display or the like.

Figure 1:
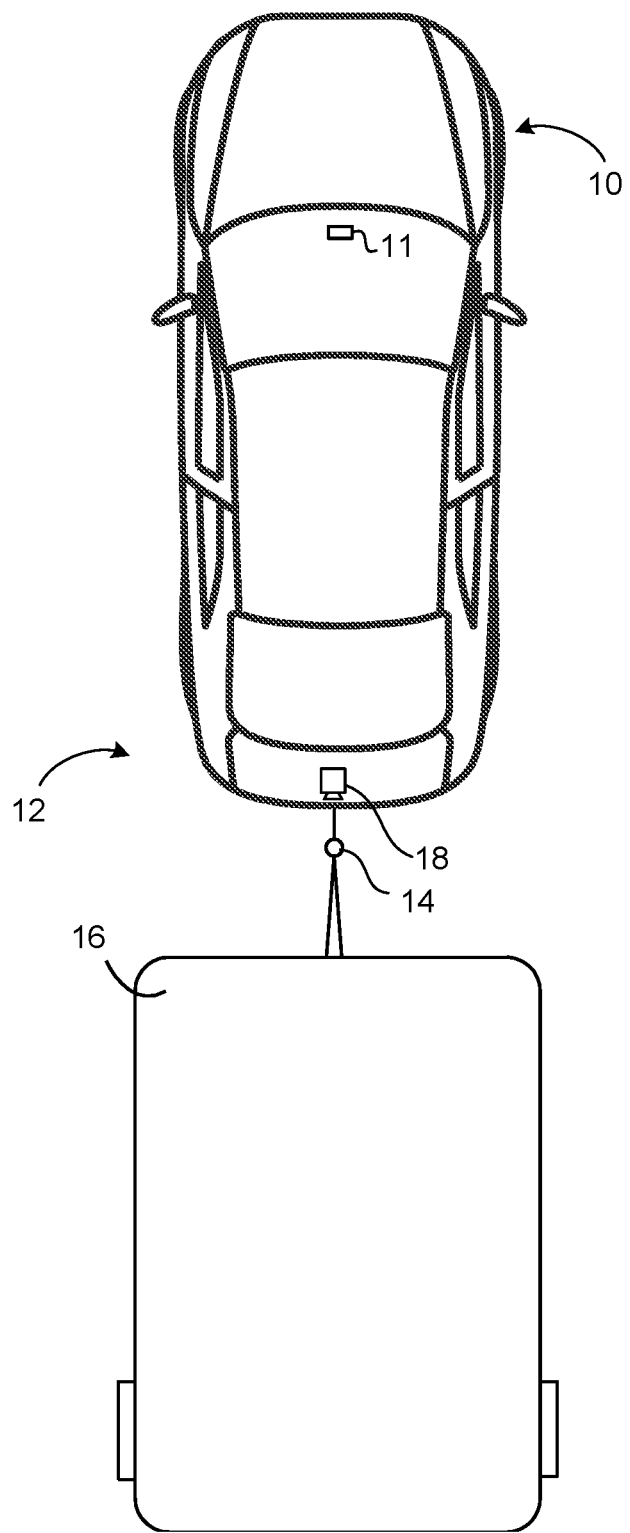
FIG. 1 is a plan view of a vehicle with a trailer assist system that is operable to determine a trailer angle relative to a vehicle in accordance with the present invention.

Referring now to the drawings and the illustrative embodiments depicted therein, a vehicle 10 includes a trailer maneuver assist system 12 that is operable to assist in backing up or reversing the vehicle with a hitched trailer that is hitched at the rear of the vehicle via a hitch 14, and the system may maneuver the vehicle 10 and trailer 16 toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior and rearward of the vehicle 10, with the field of view of the camera encompassing the hitch 14 and/or trailer 16, and with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control 11 or electronic control unit (ECU) having electronic circuitry and associated software. The electronic circuitry includes an image processor that is operable to process image data captured by the camera or cameras and that may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
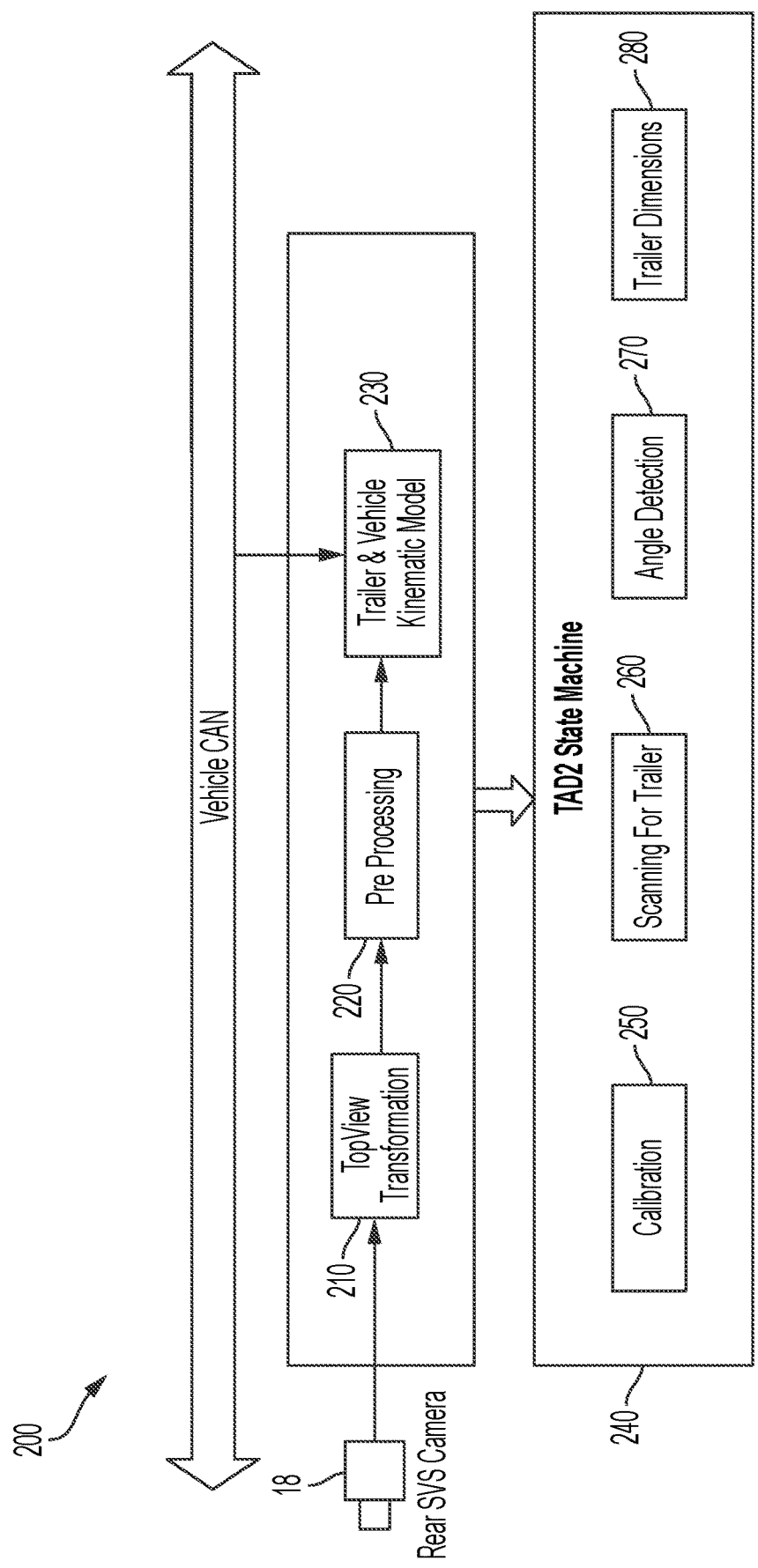
FIG. 2 is a block diagram for extracting the trailer angle in accordance with the present invention.
Figure 3:
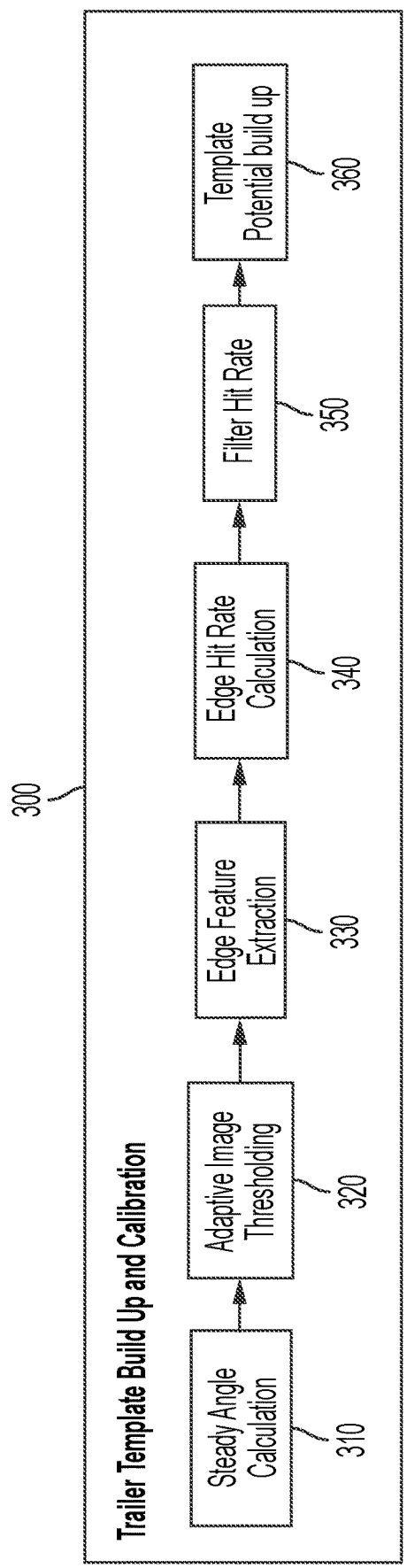
FIG. 3 is a block diagram of a calibration module for obtaining calibration data in accordance with the present invention.

Implementations herein include a novel system and/or method for the detection of trailer angle using one or more monocular cameras. The system uses a view from a rear camera of a vehicle (e.g., a truck) as an input for determining the trailer angle. To detect the trailer angle, the system performs trailer angle extraction, performs trailer calibration, performs hitch point extraction, calculates beam length, and determines trailer dimensions. Referring now to the block diagram of FIG. 2, the system includes an algorithm 200 that receives image data from a camera (e.g., the rear backup camera 18 or surround view system (SVS) camera). The image data is transformed to a top-view (i.e., a bird's eye view) at step 210 and pre-processed at step 220 and combined with data received from the vehicle CAN bus (e.g., speed, acceleration, steering wheel angle, etc.) to generate a trailer and vehicle kinematic model at step 230. The model is passed to a state machine 240 that performs (as described in more detail below) a calibration at step 250, scans for the trailer at step 260, detects the trailer angle at step 270, and determines the trailer dimensions at step 280.

The state machine 240 can, in some examples, enter two different calibration modes. A forced calibration mode (i.e., an trailer initial calibration mode) is a trailer calibration mode that the user selects and/or enables after connecting a new trailer to the vehicle. Optionally, the system detects that the trailer has not previously been hitched to the vehicle (i.e., by determining that the trailer does not match any currently stored trailer information). In this mode (i.e., a recognized trailer calibration mode), the user is expected to drive the vehicle in a straight path for a certain period of time and/or a set distance (e.g., several meters) at a constant wheel angle. The system removes all background noise and stores the calibration data into memory. Whenever the same trailer is used (as either detected by the system or selected by the user), the system may use this data to identify the trailer and locate its position. An implicit calibration mode is a mode that occurs without the knowledge of the driver/user. When the user hitches a previously calibrated trailer to the vehicle, the system enters the implicit calibration mode. This mode enables the system to internally recalibrate the trailer while the trailer is in motion (i.e., towed by the vehicle). Thus, the system uses a forced calibration mode for trailers hitched to the vehicle for the first time and the system uses an implicit calibration mode to calibrate trailers that have already been calibrated via the forced calibration mode.

Figure 4B:
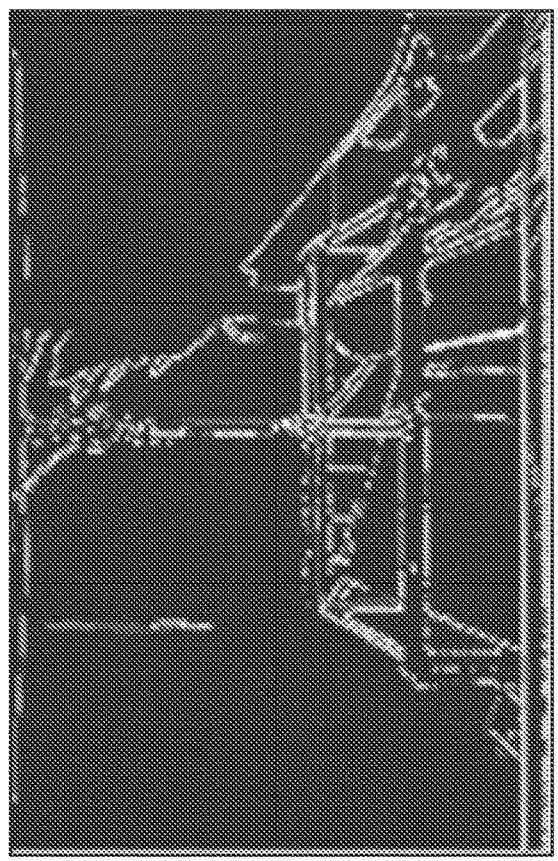
FIGS. 4A-4C are images of the calibration module extracting calibration data from images captured by a camera.
Figure 4A:
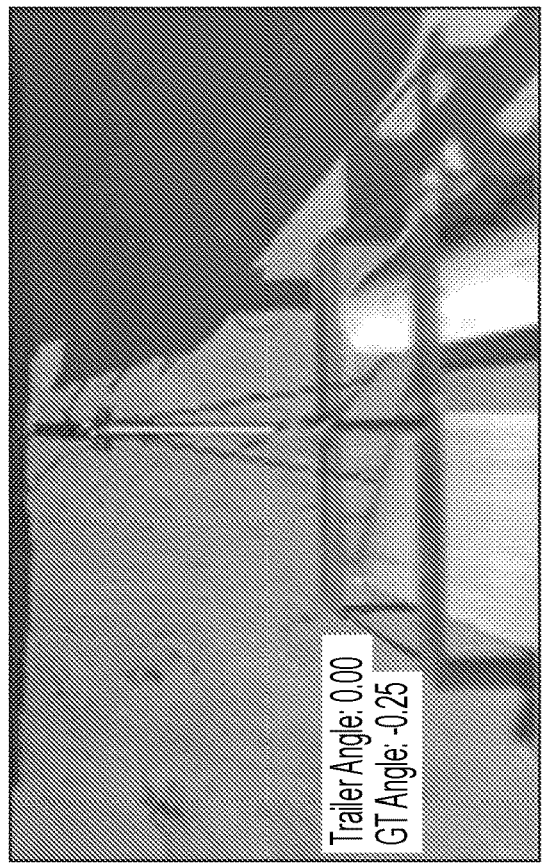
Figure 4C:
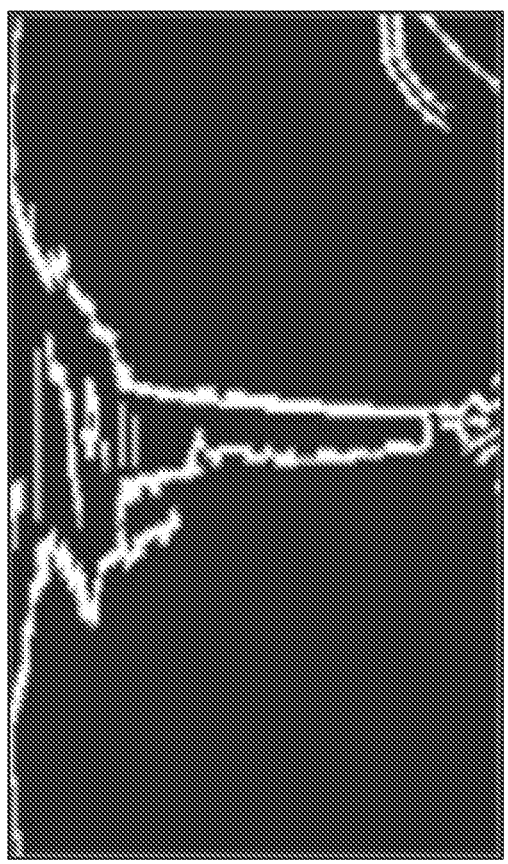

Referring now to FIGS. 3 and 4A-4C, in some implementations, the system executes a calibration module 300. The calibration module 300, when calibrating, performs a steady angle calculation 310, adaptive image thresholding 320, edge feature extraction 330, edge hit rate calculation 340, filter hit rate 350, and template potential build up 360. That is, the calibration module 300 looks for steady state angle (i.e., an unchanging angle). In some examples, the calibration module requires a steady state angle of zero to complete calibration. This is where the wheel angle of the vehicle is zero (i.e., the vehicle is not turning) and the vehicle moves for a threshold distance. For example, the driver drives the vehicle forward while not turning the wheel. During this time, image data captured by the rear-facing camera (FIG. 4A) is processed and the calibration module performs adaptive image thresholding and edge extraction (FIG. 4B). The calibration module 300 may also calculate hit rate for the various edges of the trailer. This technique increases the edge feature confidence. A hit rate filter, in some examples, removes all unwanted noise and preserves the useful features (FIG. 4C). Using the remaining useful features, the calibration module 300 generates a template for the hitched trailer.

Figure 6B:
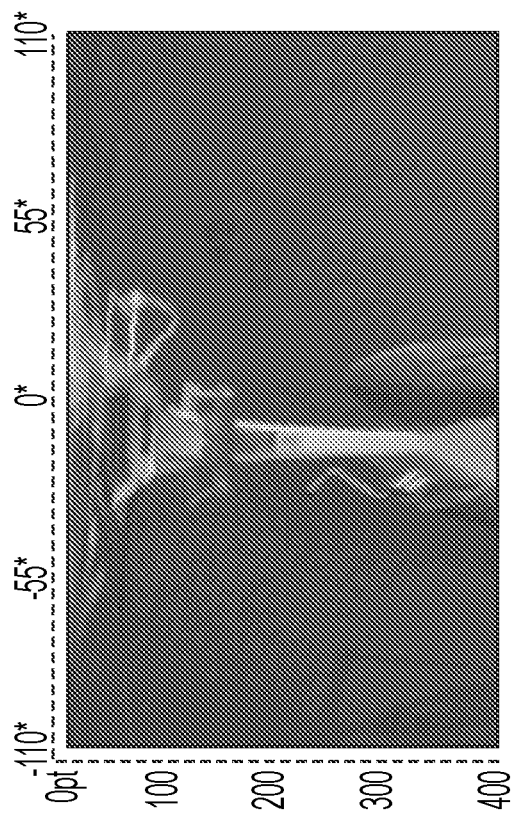
FIGS. 6A and 6B are images of the transformation module transforming an image captured by the camera.
Figure 6A:
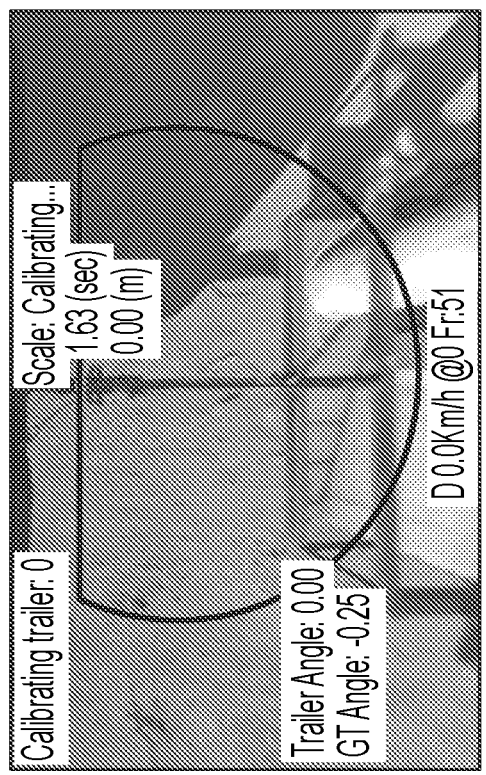

Referring now to FIG. 5, the system performs a view transformation 500 on the image data captured by the camera (e.g., a bow transformation) by performing a hitch point rotation 510, creating hand fan transformation look-up tables (LUTs) 520, performing template/feature matrix extraction 530, and performing template/feature matrix storage 540. In some examples, the feature extracted image is transformed using a view transformation that symmetrically transforms the image around the hitch position. The transformation assists in moving the feature extracted image horizontally rather than a circular motion. After the view transformation, the feature image may be ready for storage. During calibration, the system may store the details of the trailer in memory for later use. FIG. 6A illustrates an image prior to bow transformation and FIG. 6B illustrates an image after bow transformation (where the transformation may utilize aspects of the systems described in U.S. patent application Ser. No. 16/850,300, filed on Apr. 16, 2020, which is hereby incorporated herein by reference in its entirety.

Figure 7:
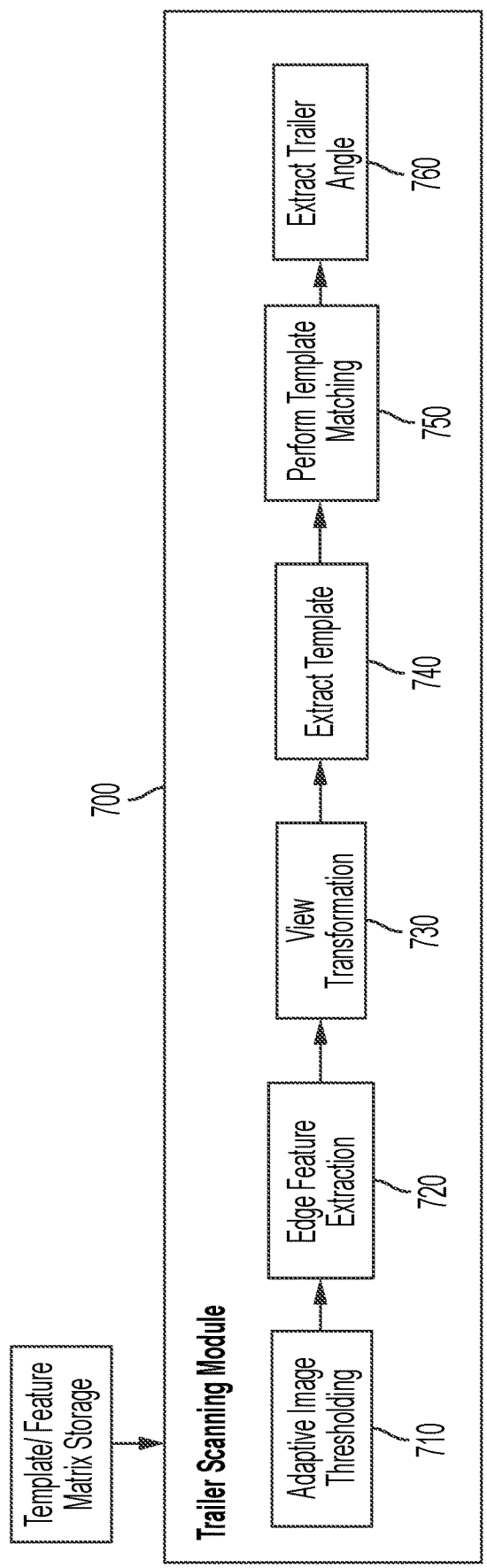
FIG. 7 is a block diagram of a trailer scanning module in accordance with the present invention.

Referring now to FIG. 7, in some examples, the system includes two scanning modes. The system may include a scanning mode for connected trailers. When the user hitches a previously hitched trailer to the vehicle, the system may automatically load the corresponding calibration data or information of the trailer and scan for the current position of the trailer. The system may identify and locate the trailer based on the feature matrix stored during the calibration. After scanning for connected trailers, the system may enter a second scanning mode that persists until the implicit calibration is performed. During this time period trailer angle may be output by the system. The control thus executes a trailer scanning module 700 that performs adaptive image thresholding 710, edge feature extraction 720, and view transformation 730. The trailer scanning module 700 extracts templates 740, perform template matching 750, and extract the trailer angle 760.

Figure 8B:
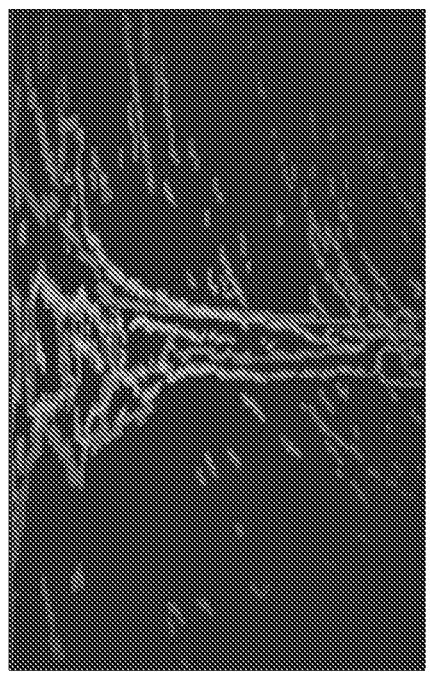
FIGS. 8A and 8B are images of the trailer scanning module extracting features from an image captured by the camera.
Figure 8A:
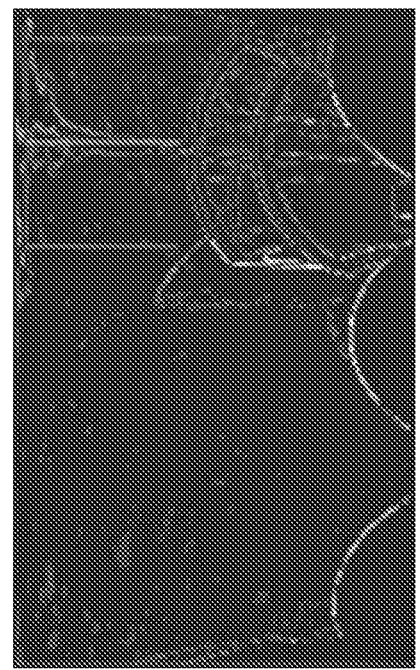

During the scanning mode, the trailer scanning module 700 loads an existing feature matrix and scans and attempts to locate the current position of the trailer using a recent feature extracted image (FIG. 8A). That is, a feature matrix is loaded from memory and compared with the feature extracted image (i.e., an image recently captured by the camera) to locate the presence and position of the trailer (FIG. 8B). The module extracts edges from the thresholded image and performs a view transformation to extract a template within a defined region of interest (ROI). This template ROI is compared with the feature matrix and the output of the comparison is a matching score. The matching score determines the position of the trailer in the image. This procedure is repeated for the full image and the relevant location of the trailer is extracted.

Figure 9:
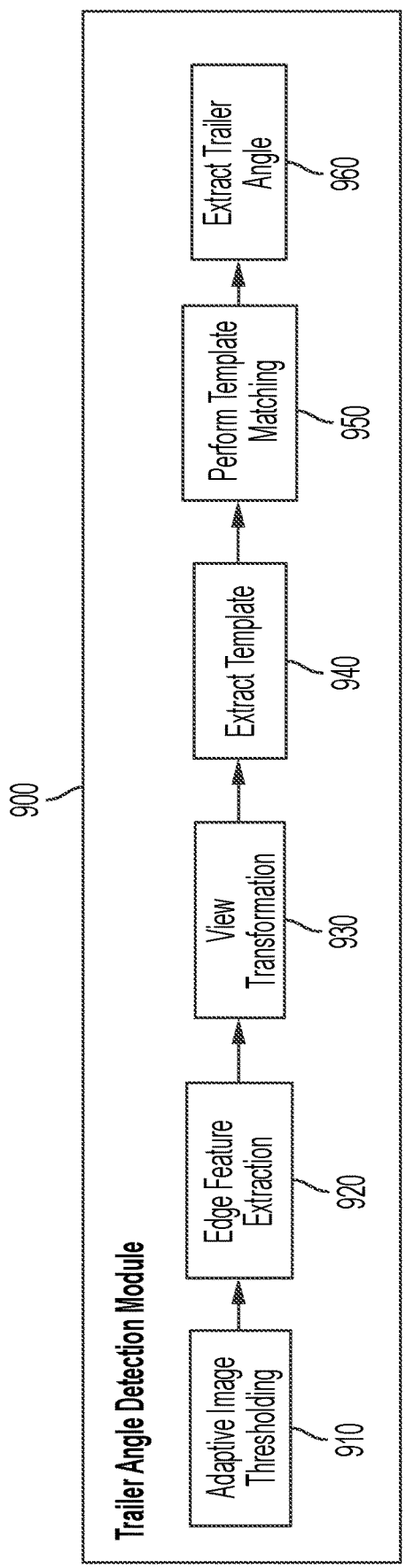
FIG. 9 is a block diagram of a trailer angle detection module in accordance with the present invention.

Referring now to FIG. 9, in some implementations, the system executes a trailer angle detection/extraction module 900. The module may perform adaptive image thresholding 910, edge feature extraction 920, and view transformation

930. The module may extract templates 940, perform template matching 950, and extract the trailer angle 960. The trailer angle detection module 900 may follow the same process as the scanning module 700 (as described above), with the exception that the search region may be limited (e.g., to the extracted ROI) and the template matching scores may be different. The module 900 may use a global and local feature matrix and the combined score validates the position of the trailer. As illustrated in FIGS. 8A and 8B, the angle may be extracted based on the position of the trailer in the image.

Figure 10:
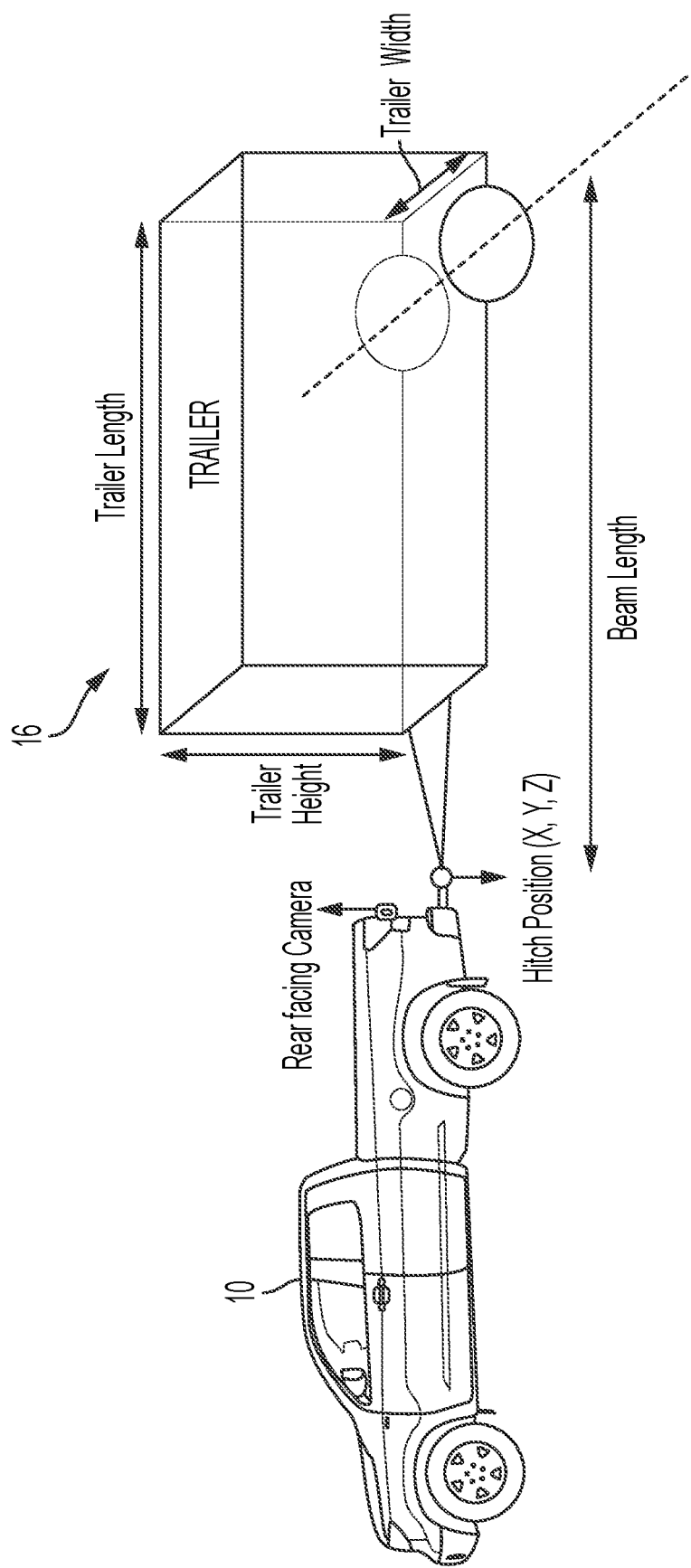
FIG. 10 is a perspective view of trailer dimensions.

Referring now to FIG. 10, the system may perform other detections and/or extractions. For example, the system may detect or extract the dimensions of the trailer 16. The dimensions that may be detected include the trailer height, the trailer length, the beam length, and/or the trailer width. The determined or extracted dimensions and information may be stored in memory for future use when that particular trailer is again hitched at the vehicle.

Thus, the present invention provides a means for a vision based system for detecting the trailer angle of a hitched trailer using a monocular camera. Image data captured by the camera may be used to determine the presence or absence of a trailer, performing trailer calibration, hitch point extraction, and trailer angle extraction. Additionally, the camera may be used to determine trailer dimensions (such as trailer length, width, or beam length).

The system may utilize aspects of the trailering or trailer angle detection systems or trailer hitch assist systems described in U.S. Pat. Nos. 9,085,261 and/or 6,690,268, and/or U.S. Publication Nos. US-2020-0017143; US-2019-0347825; US-2019-0297233; US-2019-0064831; US-2019-0016264; US-2018-0276839; US-2018-0276838; US-2018-0253608; US-2018-0215382; US-2018-0211528; US-2017-0254873; US-2017-0217372; US-2017-0050672; US-2015-0217693; US-2014-0160276; US-2014-0085472 and/or US-2015-0002670, and/or U.S. patent application Ser. No. 16/850,300, filed on Apr. 16, 2020, which is hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A trailer assist system for a vehicle, the trailer assist system comprising:
a camera disposed at a rear portion of a vehicle and viewing exterior and at least rearward of the vehicle, wherein at least a portion of a trailer hitched to the vehicle is viewed by the camera;
a control comprising electronic circuitry and associated software;
wherein the electronic circuitry of the control comprises an image processor for processing image data captured by the camera, wherein image data captured by the camera is representative of at least the portion of the trailer hitched to the vehicle that is viewed by the camera;
wherein the control, responsive to image processing of image data captured by the camera, determines whether the trailer has been previously hitched to the vehicle;
responsive to the control determining that the trailer has not been previously hitched to the vehicle, the control operates in a trailer initial calibration mode, wherein the trailer initial calibration mode comprises generating a view transformation, wherein the view transformation symmetrically transforms the image data around a hitch position of the trailer hitched to the vehicle such that features of the view transformation move horizontally instead of rotationally;
wherein the control, while operating in the trailer initial calibration mode, generates calibration data unique to the hitched trailer based on the view transformation;
responsive to the control recognizing the trailer and determining that the trailer has been previously hitched to the vehicle, the control operates in a recognized trailer calibration mode;
wherein the control, while operating in the recognized trailer calibration mode, obtains the calibration data unique to the hitched trailer;
wherein the control processes image data captured by the camera using the obtained calibration data to locate a current position of the trailer relative to the vehicle; and
wherein the control determines a trailer angle of the trailer relative to the vehicle based on the located current position of the trailer relative to the vehicle.

2. The trailer assist system of claim 1, wherein the control, responsive to locating the current position of the trailer, determines at least one dimension of the trailer.

3. The trailer assist system of claim 2, wherein the at least one dimension of the trailer comprises at least one selected from the group consisting of (i) trailer height, (ii) trailer length, (iii) trailer width and (iv) beam length.

4. The trailer assist system of claim 1, wherein the recognized trailer calibration mode comprises retrieving calibration data generated when the trailer was previously hitched to the vehicle.

5. The trailer assist system of claim 1, wherein the initial trailer calibration mode comprises instructing a driver of the vehicle to travel in a straight line for a threshold period of time.

6. The trailer assist system of claim 5, wherein the control extracts features from image data captured by the camera while the vehicle travels in a straight line to generate a feature extracted image.

7. The trailer assist system of claim 6, wherein the view transformation transforms a perspective of the feature extracted image into a bird's eye view perspective.

8. The trailer assist system of claim 6, wherein the extracted features are stored in memory for later use when performing the recognized trailer calibration mode when towing the trailer.

9. The trailer assist system of claim 1, wherein the control locates the trailer by comparing calibration data to image data captured by the camera.

10. The trailer assist system of claim 9, wherein the control compares a feature matrix from the calibration data to a feature matrix extracted from the image data captured by the camera.

11. The trailer assist system of claim 9, wherein the control generates a matching score based on the comparison of the calibration data to the image data captured by the camera.

12. A trailer assist system for a vehicle, the trailer assist system comprising:
a camera disposed at a rear portion of a vehicle and viewing exterior and at least rearward of the vehicle, wherein at least a portion of a trailer hitched to the vehicle is viewed by the camera;
a control comprising electronic circuitry and associated software;
wherein the electronic circuitry of the control comprises an image processor for processing image data captured by the camera, wherein image data captured by the camera is representative of at least the portion of the trailer hitched to the vehicle that is viewed by the camera;
wherein the control, responsive to image processing of image data captured by the camera, determines whether the trailer has been previously hitched to the vehicle;
responsive to the control determining that the trailer has not been previously hitched to vehicle, the control operates in a trailer initial calibration mode where the control extracts features from image data captured by the camera while the vehicle travels in a straight line to generate a feature extracted image;
wherein the trailer initial calibration mode comprises generating a view transformation, and wherein the view transformation symmetrically transforms the feature extracted image around a hitch position of the trailer hitched to the vehicle such that hitch point rotation of the view transformation is represented with horizontal movement instead of rotational movement;
wherein the control, while operating in the trailer initial calibration mode, generates calibration data unique to the hitched trailer based on the view transformation;
responsive to the control recognizing the trailer and determining that the trailer has been previously hitched to the vehicle, the control operates in a recognized trailer calibration mode;
wherein the control, while operating in the recognized trailer calibration mode, obtains the calibration data unique to the hitched trailer;
wherein the control processes image data captured by the camera using the obtained calibration data to locate a current position of the trailer relative to the vehicle;

wherein the control, responsive to locating the current position of the trailer, determines at least two dimensions of the trailer; and wherein the control determines a trailer angle of the trailer relative to the vehicle based on the located current position of the trailer relative to the vehicle.

13. The trailer assist system of claim 12, wherein the at least two dimensions of the trailer comprises at least two selected from the group consisting of (i) trailer height, (ii) trailer length, (iii) trailer width and (iv) beam length.

14. The trailer assist system of claim 12, wherein the recognized trailer calibration mode comprises retrieving calibration data generated when the trailer was previously hitched to the vehicle.

15. A trailer assist system for a vehicle, the trailer assist system comprising:
- a camera disposed at a rear portion of a vehicle and viewing exterior and at least rearward of the vehicle, wherein at least a portion of a trailer hitched to the vehicle is viewed by the camera;
- a control comprising electronic circuitry and associated software;
- wherein the electronic circuitry of the control comprises an image processor for processing image data captured by the camera, wherein image data captured by the camera is representative of at least the portion of the trailer hitched to the vehicle that is viewed by the camera;
- wherein the control, responsive to image processing of image data captured by the camera, determines whether the trailer has been previously hitched to the vehicle;
- responsive to the control determining that the trailer has not been previously hitched to vehicle, the control operates in a trailer initial calibration mode where the control extracts features from image data captured by the camera while the vehicle travels in a straight line to generate a feature extracted image;
- wherein the trailer initial calibration mode comprises generating a view transformation with a bird's eye view perspective, and wherein the view transformation symmetrically transforms the feature extracted image around a hitch position of the trailer hitched to the vehicle such that hitch point rotation of the view transformation is represented with horizontal movement instead of rotational movement;
- wherein the control, while operating in the trailer initial calibration mode, generates calibration data unique to the hitched trailer based on the view transformation;
- responsive to the control recognizing the trailer and determining that the trailer has been previously hitched to the vehicle, the control operates in a recognized trailer calibration mode;
- wherein the control, while operating in the recognized trailer calibration mode, obtains the calibration data unique to the hitched trailer;
- wherein the control processes image data captured by the camera using the obtained calibration data to locate a current position of the trailer relative to the vehicle;
- wherein the control, responsive to locating the current position of the trailer, determines (i) trailer height, (ii) trailer length, (iii) trailer width and (iv) beam length; and
- wherein the control determines a trailer angle of the trailer relative to the vehicle based on the located current position of the trailer relative to the vehicle.

16. The trailer assist system of claim 15, wherein the control locates the trailer by comparing calibration data to image data captured by the camera.

17. The trailer assist system of claim 16, wherein the control compares a feature matrix from the calibration data to a feature matrix extracted from the image data captured by the camera.

* * * * *